(12) United States Patent
Wang et al.

(10) Patent No.: US 7,070,536 B2
(45) Date of Patent: Jul. 4, 2006

(54) GEARING DEVICE HAVING NOISE REDUCING STRUCTURE

(76) Inventors: Jin Jye Wang, P.O.Box 63-99, Taichung (TW) 406; Jin Wen Wang, P.O.Box 63-99, Taichung (TW) 406

( * ) Notice: Subject to any disclaimer, the term of this patent is extended or adjusted under 35 U.S.C. 154(b) by 120 days.

(21) Appl. No.: 10/858,732

(22) Filed: May 31, 2004

(65) Prior Publication Data

US 2004/0248695 A1    Dec. 9, 2004

(30) Foreign Application Priority Data

Jun. 3, 2003    (TW) ............................... 92210183 U

(51) Int. Cl.
*F16H 57/12*    (2006.01)

(52) U.S. Cl. ........................................ 475/344; 74/409

(58) Field of Classification Search ................ 475/344, 475/345; 74/409, 410, 411
See application file for complete search history.

(56) References Cited

U.S. PATENT DOCUMENTS

| 2,414,134 | A | * | 1/1947 | Bartlett ......................... 74/410 |
| 2,995,046 | A | * | 8/1961 | Mansachs ..................... 74/409 |
| 4,627,310 | A |   | 12/1986 | Coburn ......................... 74/763 |
| 5,400,672 | A | * | 3/1995 | Bunch, Jr. .................... 74/409 |
| 5,406,866 | A |   | 4/1995 | Badiali ........................ 81/57.3 |

FOREIGN PATENT DOCUMENTS

GB         2 078 334 A    *    1/1982    .................. 74/410

* cited by examiner

*Primary Examiner*—Sherry Estremsky
(74) *Attorney, Agent, or Firm*—Charles E. Baxley

(57) ABSTRACT

A gearing device includes two gear members each having a number of teeth engaged with each other, to form various kinds of gear transmission structures or gearing or coupling devices. One of the gear members includes a peripheral groove formed in inner or outer portion, and a ring engaged in the peripheral groove of the gear member, and engageable with the teeth of the other gear member, to reduce noises that may be generated between the gear members. The ring may also include a number of teeth for engaging with the teeth of the other gear member, to effectively reduce the noises.

4 Claims, 3 Drawing Sheets

GEARING DEVICE HAVING NOISE REDUCING STRUCTURE

BACKGROUND OF THE INVENTION

1. Field of the Invention

The present invention relates to a gearing device, and more particularly to a gearing device having a noise reducing structure to reduce noise that may be generated between two meshed gear members.

2. Description of the Prior Art

Typical machines or tools may comprise one or more gear members and/or pinion members meshed or engaged with each other, to form various kinds of gear transmission structures or gearing or coupling devices.

For example, U.S. Pat. No. 4,627,310 to Coburn discloses one of the typical ratio speed adaptors, and comprises one or more gear members and/or pinion members meshed or engaged with each other, such as comprises one or more gear members meshed or engaged with or engaged between an internal gear and a pinion member.

U.S. Pat. No. 5,406,866 to Badiali discloses one of the typical speed selectable screw drivers, and also comprises one or more gear members and/or pinion members meshed or engaged with each other, such as comprises one or more gear members meshed or engaged with or engaged around a pinion member.

However, in these typical machines or tools, the gear members and/or the pinion members are normally made of metal materials and are typically and directly meshed or engaged with each other, such that great noises may be generated when the gear members and/or the pinion members are rotated relative to each other, particularly when the gear members and/or the pinion members are rotated in high speed relative to each other.

The present invention has arisen to mitigate and/or obviate the afore-described disadvantages of the conventional gearing devices.

SUMMARY OF THE INVENTION

The primary objective of the present invention is to provide a gearing device including a noise reducing structure to reduce noises that may be generated between two meshed gear and/or pinion members.

In accordance with one aspect of the invention, there is provided a gearing device comprising a first gear member including a peripheral portion having a plurality of first teeth provided thereon, and having a peripheral groove formed therein, a ring engaged in the peripheral groove of the first gear member, and a second gear member including a peripheral portion having a plurality of second teeth provided thereon, for engaging with the first teeth of the first gear member, and the ring being engageable with the second teeth of the second gear member, to reduce noises that may be generated between the first and the second gear members.

The ring includes a peripheral portion having a plurality of third teeth provided thereon, for engaging with the second teeth of the second gear member.

The third teeth of the ring are aligned with the first teeth of the first gear member, and may be extended outwardly beyond the first teeth of the first gear member. For example, the third teeth of the ring may be extended outwardly beyond the first teeth of the first gear member for about 0.02 mm–0.05 mm.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
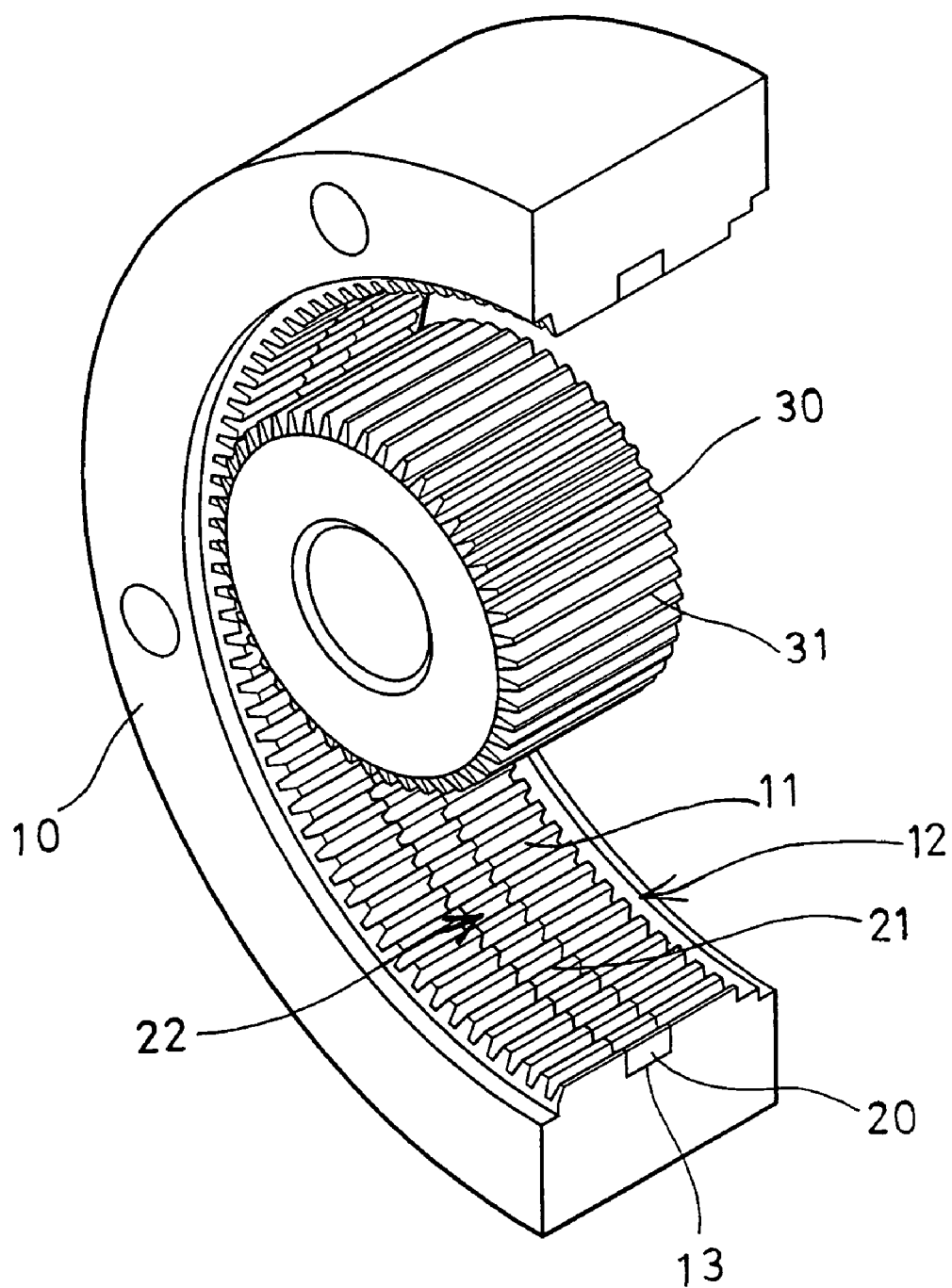
FIG. 1 is a partial perspective view illustrating a gearing device in accordance with the present invention, in which a portion of the gearing device has been cut off to show an inner structure of the gearing device.
Figure 2:
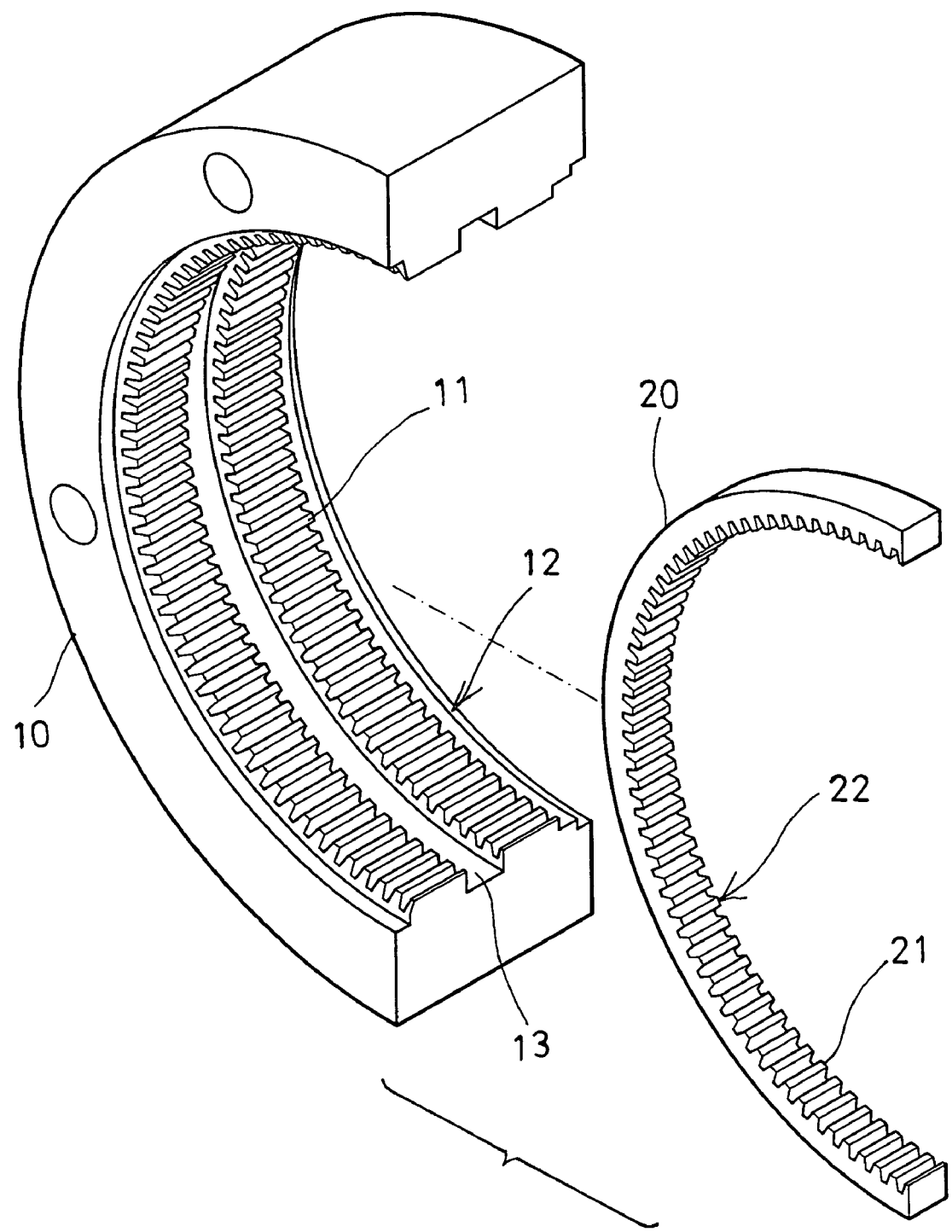
FIG. 2 is a partial exploded view of the gearing device.
Figure 3:
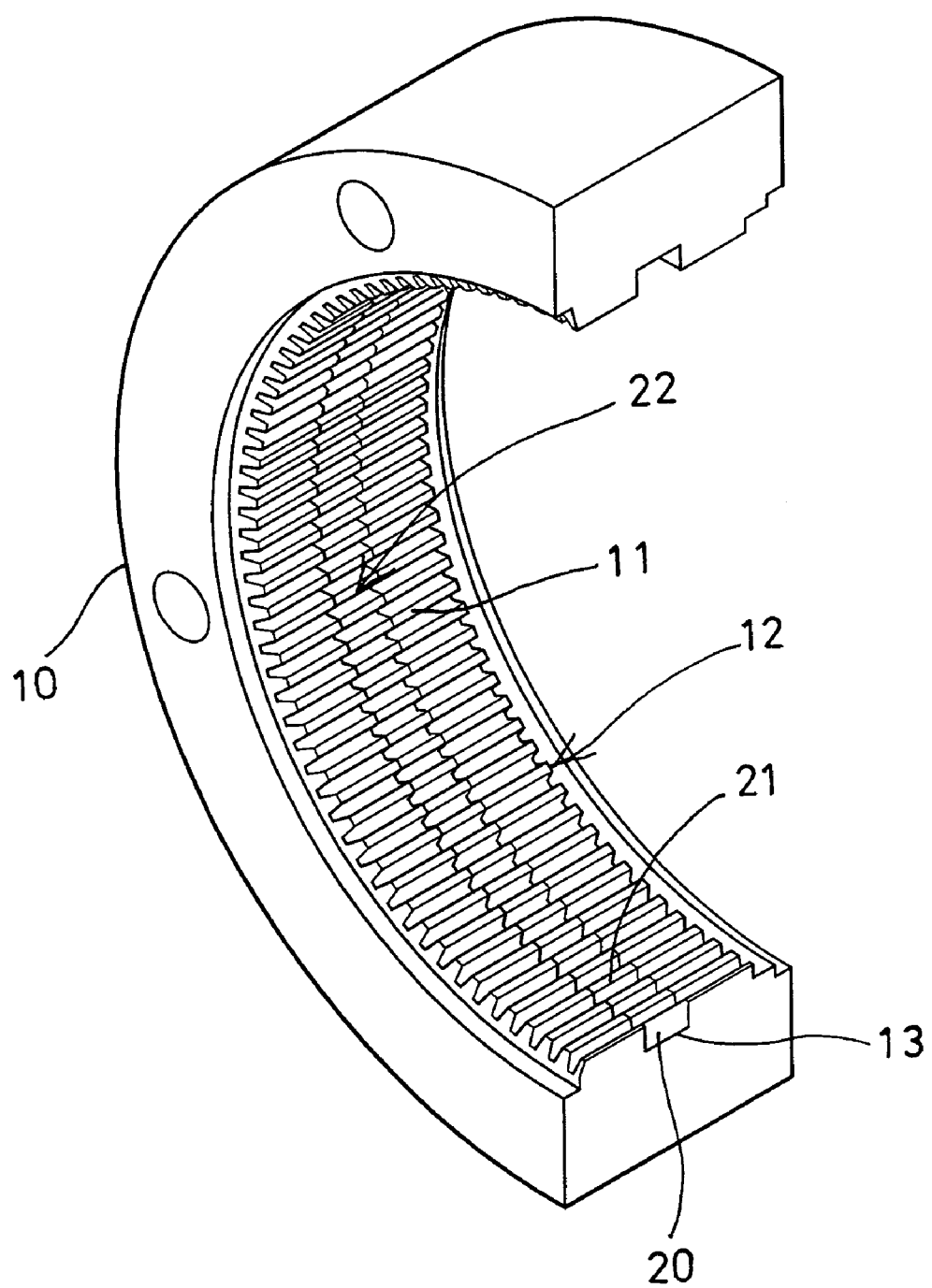
FIG. 3 is another partial perspective view of the gearing device, illustrating a portion of an internal gear of the gearing device.

Referring to the drawings, and initially to FIG. 1, a gearing device in accordance with the present invention comprises two or more gear members and/or pinion members 10, 30 meshed or engaged with each other, to form various kinds of gear transmission structures or gearing or coupling devices. The gear members and/or pinion members 10, 30 may be internal gears or typical gears.

For example, the gear member 10 is an internal gear including a number of teeth 11 formed or provided in the inner peripheral portion 12 thereof, and further including one or more inner peripheral grooves 13 formed or provided in the inner peripheral portion 12 thereof, and preferably located in an intermediate portion of the inner peripheral portion 12 thereof.

One or more rings 20 are engaged in the peripheral grooves 13 of the gear member 10, and each also includes a number of teeth 21 formed or provided in the inner peripheral portion 22 thereof and aligned with the teeth 11 of the gear member 10, and having a shape or structure or configuration similar to or corresponding to that of the teeth 11 of the gear member 10, for meshing or engaging with teeth 31 of the other gear members 30 (FIG. 1).

The teeth 21 of the ring 20, or the ring 20 is made of resilient and abrasion resistive materials, such as composite materials, synthetic materials, or the like, for engaging with teeth 31 of the other gear members 30, and for reducing noises that may be generated between the meshed gear members 10, 30 when the gear members 10, 30 are rotated relative to each other, particularly rotated in high speed relative to each other.

It is preferable that the teeth 21 of the ring 20 are slightly extended outwardly beyond the teeth 11 of the gear member 10, for such as about 0.01 mm–0.06 mm, but preferably about 0.02 mm–0.05 mm, for allowing the teeth 21 of the ring 20 to be suitably engaged with the teeth 31 of the other gear members 30, and thus to effectively reduce the noises that may be generated between the meshed gear members 10, 30.

It is to be noted that the gear member 10 is shown to be an internal gear having a number of teeth 11 formed or provided in the inner peripheral portion 12 thereof. However, the gear member 10 may also be an external gear having a number of teeth (not shown) formed or provided in an outer peripheral portion thereof, and having one or more peripheral grooves (not shown) formed or provided in the outer peripheral portion thereof, for receiving rings (not shown) that have teeth (not shown) formed or provided on the outer peripheral portion thereof.

Accordingly, the gearing device in accordance with the present invention includes a noise reducing structure to reduce noises that may be generated between two meshed gear and/or pinion members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A gearing device comprising:
   a first gear member including a peripheral portion having a plurality of first teeth provided thereon, and having a peripheral groove formed therein,
   a ring engaged in said peripheral groove of said first gear member, and
   a second gear member including a peripheral portion having a plurality of second teeth provided thereon, for engaging with said first teeth of said first gear member, and said ring being engageable with said second teeth of said second gear member, to reduce noises that may be generated between said first and said second gear members, and
   said ring including a peripheral portion having a plurality of third teeth provided thereon for engaging with said second teeth of said second gear member.

2. The gearing device as claimed in claim 1, wherein said third teeth of said ring are aligned with said first teeth of said first gear member.

3. The gearing device as claimed in claim 1, wherein said third teeth of said ring are extended outwardly beyond said first teeth of said first gear member.

4. The gearing device as claimed in claim 3, wherein said third teeth of said ring are extended outwardly beyond said first teeth of said first gear member for 0.02 mm–0.05 mm.

* * * * *